(12) United States Patent
Dotzler et al.

(10) Patent No.: US 6,603,365 B1
(45) Date of Patent: Aug. 5, 2003

(54) REAL-TIME CLOCK BACKUP

(75) Inventors: Kevin Dotzler, San Diego, CA (US);
Glenn Garbeil, Carlsbad, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/113,325

(22) Filed: Mar. 28, 2002

(51) Int. Cl.[7] .............................................. H03B 1/00
(52) U.S. Cl. ........................ 331/74; 331/158; 331/185; 331/173
(58) Field of Search ......................... 331/185, 74, 158, 331/173; 307/64

(56) References Cited

U.S. PATENT DOCUMENTS 3,986,136 A * 10/1976 Hurlburt ...................... 331/78
6,157,265 A * 12/2000 Hanjani ....................... 331/49
6,160,458 A * 12/2000 Cole et al. ................... 331/158

* cited by examiner

Primary Examiner—Terry D. Cunningham
Assistant Examiner—Long Nguyen
(74) Attorney, Agent, or Firm—Harness, Dickey & Pierce, PLC

(57) ABSTRACT

A real-time clock circuit for saving real time information during removal of a battery is presented. The battery provides power to the clock circuit during a steady-state mode. The clock circuit includes an oscillator assembly for generating a periodic waveform. A counter accumulates real time information in response to the periodic waveform. An energy storage device is coupled to the counter to supply energy to the counter while the battery is removed. A switch is coupled between the battery and the energy storage device to prevent the energy storage device from supplying energy to components other than the counter during removal of the battery. The switch provides a path for energy to flow from the battery to the energy storage device, thereby charging the energy storage device.

11 Claims, 1 Drawing Sheet

REAL-TIME CLOCK BACKUP

TECHNICAL FIELD

The present invention relates to wireless communication devices, and more particularly to clock circuits within wireless communication devices.

BACKGROUND

The use of wireless communication systems continues to expand. Wireless devices allow a user to communicate voice or data to other devices and people without having to remain in a fixed location. This allows users to, for example, move freely about the community while talking on the phone. The price for the convenience of using wireless devices is the addition of one more item to our already cluttered pockets and purses. To reduce the impact of wireless devices on our pockets, consumers have demanded smaller, lighter, less expensive devices that include more features such as programmable alarms and automated power control.

To implement automated and programmable functions, a real time clock within the wireless device is generally required. The real time clock provides a precise representation of time which can be compared to stored values in registers to provide automated functions. During power interruptions, the real time clock is typically powered from either a dedicated clock battery, such as a small button cell, or from a storage capacitor. If power interruptions are expected to be relatively long, then a dedicated clock battery is used. If on the other hand the power interruption is expected to be relatively short, such as upwards of 30 seconds for a battery change operation, then a storage capacitor is used. In both cases, the backup power source, battery or storage capacitor, adds weight and uses additional space, thereby increasing the size and weight of the wireless device. Since the backup power source must supply all of the power for the real time clock during the power interuption, the size of the backup power source is directly related to the power that is drawn by the real time clock during the power interruption. Universally, conventional circuits in both cases continue to maintain accurate time during the power interruption. After all, a real time clock is supposed to provide the real time. However, maintaining accurate time places a greater power load on the backup power source, necessitating a larger battery or storage capacitor. What is needed is a system to reduce the power consumed by the real time clock circuit during a power interuption so that a smaller, lighter backup power source may be used. A smaller, lighter backup source translates to a smaller, lighter wireless device.

SUMMARY

The present real-time clock circuit saves real time information during removal of a battery. The battery provides power to the clock circuit during a steady-state mode. The clock circuit includes an oscillator assembly for generating a periodic waveform. A counter accumulates real time information in response to the periodic waveform. An energy storage device is coupled to the counter to supply energy to the counter while the battery is removed. A switch is coupled between the battery and the energy storage device to prevent the energy storage device from supplying energy to components other than the counter during removal of the battery. The switch provides a path for energy to flow from the battery to the energy storage device, thereby charging the energy storage device.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
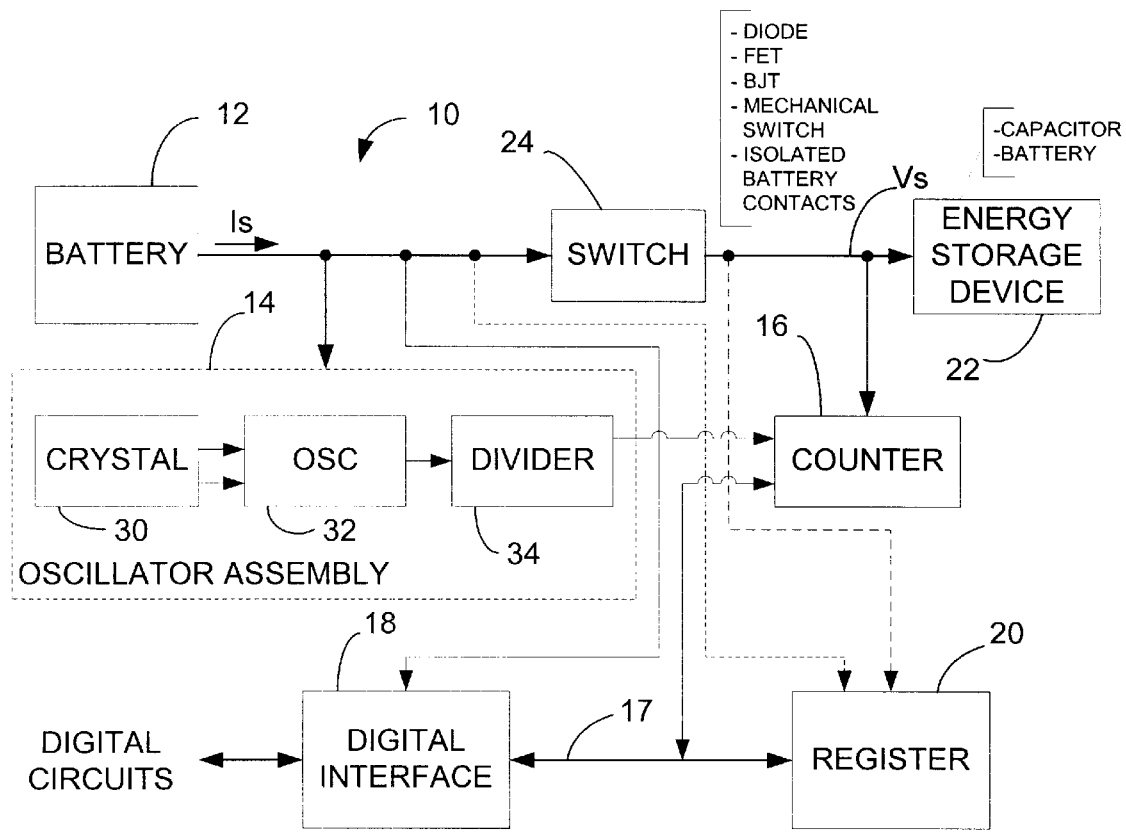
FIG. 1 is a block diagram of a clock circuit in accordance with the principles of the invention.

Referring to FIG. 1, a clock circuit 10 in accordance with the principles of the present invention is shown. The clock circuit 10 has two modes of operation, a backup mode and a steady-state mode. During the steady-state mode, a battery 12 provides power to the clock circuit 10. During the backup mode, an energy storage device 22 supplies power to a limited number of components in the clock circuit 10. The clock circuit of the present invention advantageously minimizes power consumption during a battery replacement operation by automatically entering backup mode. The reduction in power consumption permits the use of smaller, lighter energy storage components for supplying,energy during the battery replacement operation.

The clock circuit 10 includes an oscillator assembly 14 for generating a periodic waveform such as a sine wave or pulse train. The oscillator assembly 14 may be any periodic waveform generator including crystal oscillators and LC oscillators. Preferably, the oscillator assembly 14 includes a combination of a crystal 30, an oscillator circuit 32, and a divider 34. The oscillator assembly 14 is not limited to including a divider 34. The crystal 30 generates a precision frequency, low-level alternating signal that the oscillator circuit 32 buffers and amplifies. The divider 34 divides the frequency of the alternating signal to a frequency that is suitable for obtaining a desired time resolution. The oscillator circuit 32 preferably operates at a frequency of about 32 kHz to reduce power consumption, but those skilled in the art will recognize that the scope of the invention is not limited to any particular range of frequencies.

The periodic waveform is coupled to a counter 16 that tracks the quantity of pulses applied by the oscillator assembly 14. The quantity of pulses recorded by the counter 16 corresponds to a representation of real-time information. A bus 17 connects the counter 16 to a set of one or more registers 20 and a digital interface 18. The register 20 stores data corresponding to time instants at which an automated event such as an alarm is to occur. The digital interface 18 couples the counter 16 and registers 20 to other logic circuits such as a processor (not shown) for controlling operations including the entering of data into the register 20 and setting/resetting the counter 16.

During time periods when the battery 12 is being replaced, the energy storage device 22 provides backup power to the counter 16 and register 20 so that both the real time information and the automated function times are saved during the interruption in power. Preferably, a capacitor is used as the energy storage device 22. The scope of the invention also includes supplying backup power merely to the counter 16, and not to the register 20, nor other components of the clock circuit 10. In this instance, the real time information is saved, but the automated function information is lost during the power interruption.

During steady-state operation, the energy storage device 22 is charged from the battery 12 through a switch 24. The switch 24 is preferably a diode, but the scope of the invention includes any electrical or mechanical switch that permits current to flow from the battery 12 to the energy storage device 14 during steady-state operation, and prevents current from flowing from the energy storage device 14 back to the unbacked up portions of the clock circuit 10 during backup mode. Examples of electrical switches include diodes, BJTs, and FETs. Examples of mechanical switches include a basic single-pole double-throw switch, as well as using isolated battery contacts to connect the battery 12 separately to the energy storage device 22 and the un-backed up portion of the clock circuit 10.

Figure 2:
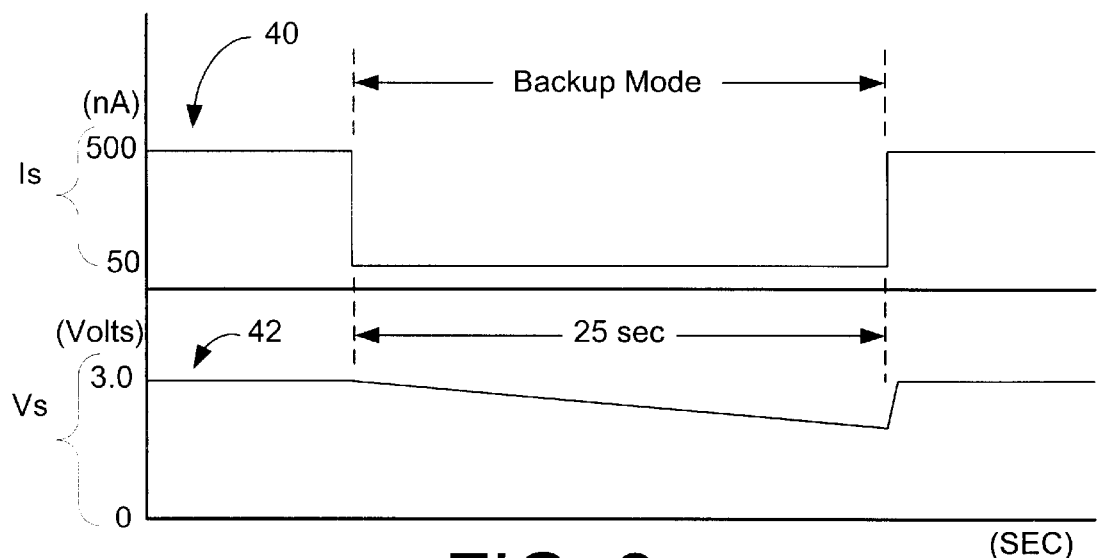
FIG. 2 illustrates waveforms associated with the presently preferred embodiment of the invention.

Referring to FIGS. 1 and 2, voltage and current waveforms associated with a presently preferred embodiment of the invention are illustrated. In the presently preferred embodiment, both the counter 16 and register 20 are powered during backup mode. Waveform Is 40 depicts the current flowing from the battery 12 into the clock circuit 10. Waveform Vs 42 depicts the voltage across the energy storage device 22. During steady-state operation, the current flowing to the clock circuit 10 is nominally 500 nAmps. The voltage across the energy storage device 22 is approximately 3 volts. When the battery 12 is removed for replacement, power flows out of the energy storage device 22 to the counter 16 and register 20. The total draw from the energy storage device 22 during backup mode is approximately 50 nAmps since no power flows to the oscillator assembly 14, nor digital interface 18. Lacking a source of power, the oscillator assembly 14 stops generating pulses. The real-time information in the counter 16 remains static since the counter 16 does not receive the pulses required to increment the real-time information. Although the counter 16 does not continue to increment, the real-time information that was present before removing the battery 12, remains valid. While power is drawn from the energy storage device 22, the voltage Vs slowly decays towards zero. Once the new battery 12 is installed, power once again flows from the battery 12 to the clock circuit 10, including a portion through the switch 24 to charge the energy storage device 22. The counter 16 then resumes tracking the periodic waveform from the oscillator assembly 14.

The invention recognizes that sacrificing a small amount of accuracy in the real-time information by pausing the counting of time during battery replacement, permits a significantly smaller energy storage device 22 to be used. In the presently preferred embodiment, the size of the energy storage device is reduced by a factor of more than 2. The slight decrease in the accuracy of real-time information is typically of short durations, lasting only until the next time the wireless device is connected to a network or computer.

A number of embodiments of the invention have been described. Nevertheless, it will be understood that various modifications may be made without departing from the spirit and scope of the invention. For example, the switch 24 may be an electrical device such as a diode, or a mechanical device such as a single pole switch. Accordingly, other embodiments are within the scope of the following claims.

What is claimed is:

1. A real-time clock circuit for saving real time information during removal of a battery, the battery for providing power to the clock circuit, comprising:

an oscillator assembly for generating a periodic waveform;

a counter, operable in response to the periodic waveform, to accumulate real time information;

an energy storage device coupled to the counter to supply energy to the counter while the battery is removed; and a switch coupled between the battery and the energy storage device to prevent the energy storage device from supplying energy to components other than the counter during removal of the battery, the switch providing a path for energy to flow from the battery to the energy storage device, thereby charging the energy storage device.

2. The real-time clock backup circuit of claim 1 further comprising at least one register coupled to the energy storage device, such that automated function information is saved during removal of the battery.

3. The real-time clock backup circuit of claim 1 wherein the oscillator assembly is selected from the group consisting of crystal oscillators and LC oscillators.

4. The real-time clock backup circuit of claim 1 wherein the switch is selected from the group of diodes, transistors, FET's, and mechanical switches.

5. The real-time clock backup circuit of claim 1 wherein the energy storage device is a capacitor.

6. A real-time clock circuit for saving real time information during removal of a battery, the battery providing power to the clock circuit, comprising:

an oscillator assembly for generating a periodic waveform;

a counter, operable in response to the periodic waveform, to accumulate real time information;

a register to store automated function information;

a capacitor coupled to the counter and register to supply energy to the counter and the register while the battery is removed; and a switch coupled between the battery and the capacitor to prevent the capacitor from supplying energy to components other than the counter during removal of the battery, the switch providing a path for energy to flow from the battery to the capacitor, thereby charging the capacitor.

7. The real-time clock backup circuit of claim 6 wherein the oscillator assembly includes a combination of a crystal and an oscillator circuit.

8. The real-time clock backup circuit of claim 6 wherein the switch is selected from the group of diodes, transistors, FET's, and mechanical switches.

9. A real-time clock circuit for saving real time information during removal of a battery, the battery providing power to the clock circuit, comprising:

an oscillator assembly for generating a periodic waveform;

a counter, operable in response to the periodic waveform, to accumulate real time information;

a register to store automated function information;

a capacitor coupled to the counter and register to supply energy to the counter and the register while the battery is removed; and a unidirectional switch coupled between the battery and the capacitor to prevent the capacitor from supplying energy to components other than the counter during removal of the battery, the unidirectional switch providing a path for energy to flow from the battery to the capacitor, thereby charging the capacitor.

10. The real-time clock backup circuit of claim 9 wherein the unidirectional switch is a diode.

11. The real-time clock backup circuit of claim 9 wherein the oscillator assembly includes a combination of a crystal and an oscillator circuit.

* * * * *